May 3, 1927.

A. J. C. BROOKES

ADJUSTABLE LIMIT GAUGE

Filed Oct. 15, 1925

1,627,146

A.J.C.Brooks
Inventor
By: Marks and Clerk
Attys

Patented May 3, 1927.

1,627,146

UNITED STATES PATENT OFFICE.

ARTHUR JOHN CHARLES BROOKES, OF BRIDGNORTH, ENGLAND.

ADJUSTABLE LIMIT GAUGE.

Application filed October 15, 1925, Serial No. 62,625, and in Great Britain January 1, 1925.

This invention relates to improvements in limit gauges and consists in an improved form of gauge and method of adjusting and retaining the measuring anvils so as to give any desired gap or distance between the anvils in certain predetermined steps, as for instance in steps of 0.0001 inch, by means of certain fixed-size parallel anvil-pieces together with parallel distance-pieces which can be placed between the anvil-pieces and flat parallel faces formed on the gauge frames. The anvils and distance-pieces are held on to the gauge frames by means of a certain kind of screw hereinafter described.

The invention is specially applicable to the well known type of gap limit gauge, used for external measurement within certain limits, in which one fixed gap is of such size as to pass over the work part being gauged during manufacture, while another fixed gap is of such size as must not pass over the work; commonly known as "go" and "not-go" dimensions, respectively.

The method commonly adopted for the adjustment of the measuring anvils of outside limit gauges is that provided by adjusting screw devices which push the anvils forward, the anvils being usually held by separate locking devices when adjusted. Such means involve the use of additional length standards to which the anvils are adjusted by the agency of "feel"; and the result may be proper or faulty adjustment according to the skill of the operator.

In this invention, I provide the adjustment by means of the insertion of certain fixed-dimension parallel distance-pieces in between fixed-dimension parallel anvils and the parallel faces provided on the gauge frames, and then tightening the anvils and distance-pieces up against the faces on the gauge frames by means of special screws. The distance between the parallel surfaces of the gauge frames is made true to a certain prescribed dimension during manufacture.

The object of the invention is to provide fixed "high" and "low" limits of any dimension, in steps of 0.0001 inch, from about 1-inch up to the practical range of these gauges; the adjustment being made without reference to additional length standards and independent of the skill of the adjusting operator. To achieve this, the individual gauge frames may be made in a convenient series of sizes, as for instance, 1, 2, 3, 4, 5, 6, 7, 8, 9, 10, 11 and 12 inches, up to any size within the practical range.

The distance-pieces are conveniently made in the following serial sizes, in inches:—
Series (I) 0.1001, 0.1002, 0.1003, 0.1004, 0.1005, 0.1006, 0.1007, 0.1008, 0.1009.
Series (II) 0.101, 0.102, 0.103, 0.104, 0.105, 0.106, 0.107, 0.108, 0.109.
Series (III) 0.11, 0.12, 0.13, 0.14, 0.15, 0.16, 0.17, 0.18, 0.19.
Series (IV) 0.1, 0.2, 0.3, 0.4, etc.

The anvil-pieces may be made in the following sizes, in inches, 0.25, 0.3, and 0.5; or any other suitable length. The anvil-pieces, being subject to wear in use, are provided in numbers of the same size for replacement.

When made by means and method described in patent numbered 1,537,622, and applications numbered 389,044 and 40,072, it is found easily possible to make these distance-pieces and anvil-pieces true to size within 0.00001-inch under conditions of commercial manufacture.

The drawings illustrate one convenient form of the limit gauges in accordance with this invention:—

Figure 1:
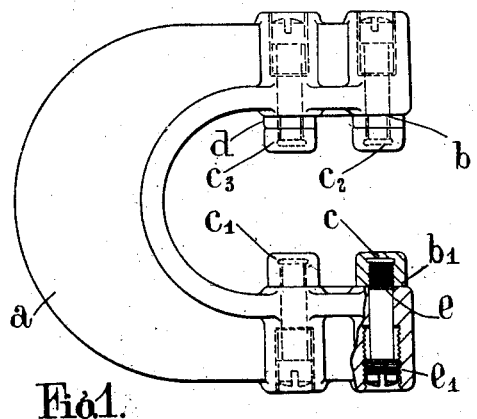
Figure 1 is a side elevation of a gauge frame, with one of the holding screws of the adjustable anvils shown by a partial cross section of the particular part of the gauge frame.
Figure 2:
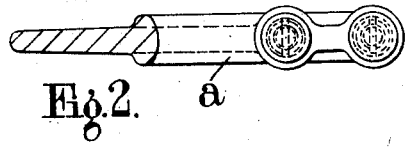
Figure 2 is a view of same at right-angles to the view of Figure 1.
Figure 3:
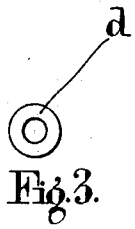
Figure 3 is a face view of one form of the distance-pieces.
Figure 4:
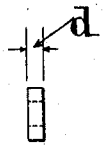
Figure 4 is an edge view of same.
Figure 5:
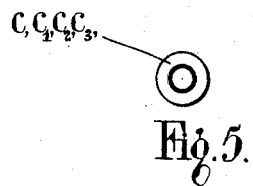
Figure 5 is a face view of one form of the anvil-pieces.
Figure 6:
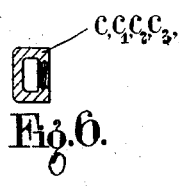
Figure 6 is a central cross section of same, showing the internally screwed portion.

In carrying the invention into effect in one convenient manner, I provide frames $a$ of any suitable metal, on which are provided two faces $b$ and $b_1$, which are made truly parallel with each other and a certain basic distance apart.

The anvil-pieces $c$, $c_1$, $c_2$ and $c_3$ and also the distance-pieces $d$ are held in working contact with the flat faces, $b$ and $b_1$, by means of the special screws $e$—$e_1$. The points of the screws, $e$, are made with a right-hand thread and the heads, $e_1$, have a left-hand thread. The manner of adjusting the anvil-pieces towards each other is as follows:—Supposing it is required to close the anvils $c$ and $c_2$ by an amount equal to 0.3003-inch; the screw would be loosened with a suitable tool and the anvil $c$ be removed, distance-pieces of thicknesses 0.1003 and 0.2000-inch would then be placed over the point $e$ of the screw which would be screwed forward by the left-hand screw thread $e_1$ until the point protrudes a suitable distance through and beyond the outside face of the distance-pieces; the anvil-piece $c$ would then be replaced and lightly tightened by hand on the screw; the screw would then be tightened by the tool and, by virtue of these right- and left-hand screws, the anvil-pieces and distance-pieces would be held tightly in working position on the flat face $b_1$. The screw-thread $e$ is made a fairly loose fit so that the anvil-pieces can accommodate themselves to lie properly flat against the other flat and parallel surfaces.

It will be understood that with the gauge frames made of a suitable form, with the anvil-pieces on the outside instead of inside the frames, this adjustment can be fitted to inside limit gauges. In this latter case, for cylindrical work, the measuring faces of the anvils would necessarily be of a spherical form.

Conveniently the distance-pieces and anvil-pieces are made by the use of apparatus forming the subject-matter of my co-pending application for Letters Patent No. 40,072 filed the 27th day of June, 1925, and in accordance with methods described therein.

Having now described my invention what I claim as new and desire to secure by Letters Patent is:—

1. An adjustable limit gauge comprising a solid frame having parallel flat surfaces spaced a fixed basic distance apart, anvil-pieces of predetermined length in flat contact with said flat surfaces and right- and left-hand screw-threaded elements, one thread of which engages an anvil-piece while the other engages the solid frame.

2. An adjustable limit gauge comprising a solid frame having parallel flat surfaces spaced a fixed basic distance apart, means whereby anvil-pieces of predetermined length may be detachably secured in flat surface contact with said surfaces, and flat and parallel annular pieces intervening between said anvil-pieces and said surfaces.

3. An adjustable limit gauge comprising a solid frame having parallel flat surfaces thereon spaced a fixed distance apart and flat and parallel adjusting pieces associated with said surfaces, said solid frame having screw-threaded recesses and screw-threaded elements engaging in said recesses and each having a second screw thread thereon for securing said flat parallel pieces in flat surface contact with said surfaces.

4. A frame for a limit gauge having parallel flat surfaces spaced a fixed distance apart and means whereby anvil-pieces and distance-pieces may be secured in relation to said surfaces to provide a pair of gauging gaps of any desired limiting dimensions.

5. An adjustable limit gauge comprising a solid frame provided with a plurality of parallel flat surfaces spaced a fixed basic distance apart, there being perforations in the body of said fame extending through said plane surfaces and having internal screw threads therein, anvil-pieces provided with internally screw-threaded recesses and external screw-threaded elements engaging the screw threads of the perforations in the frame and the screw-threaded recesses in the anvil pieces.

6. An adjustable limit gauge comprising a solid frame provided with a plurality of parallel flat surfaces spaced a fixed basic distance apart, there being perforations in the body of said frame extending through said plane surfaces, internal screw threads in said perforations, anvil-pieces provided with internally screw-threaded recesses and externally screw-threaded elements engaging the screw threads of the perforations in the frame and screw-threaded recesses in the anvil-pieces, the screw threads in the recess in the anvil and the screw threads in the perforation in the frame being of opposite senses.

In testimony whereof I have signed my name to this specification.

ARTHUR JOHN CHARLES BROOKES.